March 28, 1950     S. RICHMAN     2,501,741
NECKTIE
Filed May 11, 1948
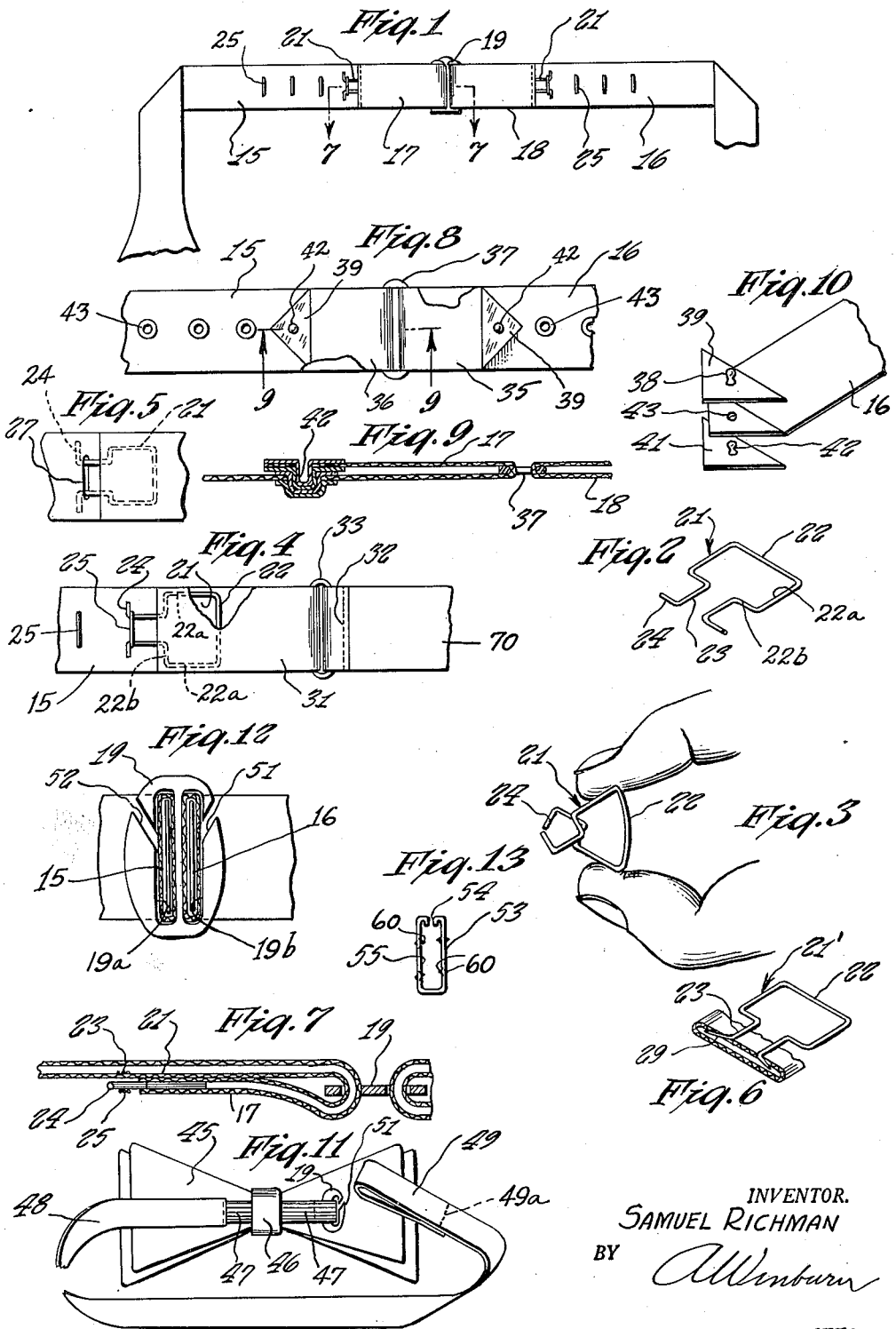
INVENTOR.
SAMUEL RICHMAN
BY
ATTORNEY Patented Mar. 28, 1950

2,501,741

UNITED STATES PATENT OFFICE 2,501,741

NECKTIE

Samuel Richman, East Orange, N. J.

Application May 11, 1948, Serial No. 26,309

4 Claims. (Cl. 2—155)

My invention relates generally to neckties. More particularly my invention is directed toward an improved construction for neckties wherein the neckband portions thereof may be adjusted to fit various sizes.

One of the objects of my invention is to provide a necktie construction of the character described having novel means for adjusting the neckband according to selected sizes and for releasably maintaining said neckband in any selected size.

Another object of my invention is to provide in a necktie construction wherein the neckband portion is made of two interconnected parts and is adjustable to various sizes, improved and novel releasable fastening means for maintaining said neckband in any selected size, which shall be so constructed and arranged as to additionally maintain the shape and contour of the free end or ends of the neckband parts.

Still another object of my invention is to provide in a necktie construction wherein the neckband portion is made of two interconnected parts, a highly improved and novel interconnector member for said neckband parts.

Other objects of my invention will become apparent from the description to follow or will hereinafter be more particularly pointed out.

In the accompanying drawings:

Fig. 1 is a fragmentary elevational view of a necktie of the bow tie type showing the inner surface of a portion of the neckband, constructed and arranged in accordance with my invention;

Fig. 2 is an enlarged perspective view of one of the fastener elements removed from the neckband shown in Fig. 1;

Fig. 3 is a side elevational view of the fastener element shown in Fig. 2 being compressed by thumb and finger to condition the same for passage through a loop or slot in the neckband;

Fig. 4 is a fragmentary elevational view similar to Fig. 1, but larger in size and illustrating a modified form of my invention and with a portion of the neckband inner surface broken away to show the manner in which the fastener element is disposed within the neckband;

Fig. 5 is a fragmentary elevational view similar to Figs. 1 and 4 but showing the fastener element extended into a slit in the strap instead of into a loop;

Fig. 6 is a fragmentary and perspective view showing a modified form of fastener element;

Fig. 7 is an enlarged sectional view taken on line 7—7 of Fig. 1;

Fig. 8 is a fragmentary elevational view similar to Figs. 1 and 4 but illustrating a modified form of fastener element;

Fig. 9 is a sectional view taken on line 9—9 of Fig. 8;

Fig. 10 is a perspective exploded view of one of the neckband ends shown in Figs. 8 and 9 and illustrating the manner of assembling the same;

Fig. 11 is a rear perspective view of a bow tie employing a connector member in accordance with my invention;

Fig. 12 is an enlarged elevational view of a form of connector plate adapted for use in the Figs. 1, 8 and 11 forms of invention; and Fig. 13 is an elevational view of another modified form of connector member which may be employed in the various forms of invention illustrated in the drawings.

Referring now to the drawings and more particularly to Figs. 1 to 3, 7 and 12 thereof, I have shown a necktie of the so-called bow tie type constructed and arranged in accordance with my invention and comprising the neckband parts 15 and 16. Each of the said parts 15 and 16 terminates at their outer ends in enlarged fat portions (not shown) of standard, well known bow tie construction. The inner ends 17 and 18 of the neckbands 15 and 16 are bent over on themselves to loops which are received in openings 19a and 19b of a connector 19, shown in detail in Figs. 7 and 12 of the drawings. The said necktie parts 15 and 16 may be made of inner and outer layers of suitable fabric in the usual manner. As noted the inner free ends 17 and 18 are each provided with fastener members 21, shown in detail in Fig. 2 which are preferably formed of wire and bent into a substantially rectangular portion 22, and a pair of integral parallel spaced arms 23 extending from the portion 22, the said arms 23 terminating in outwardly oppositely extending projections 24. The member 21 being of wire is so constructed and arranged whereby inward pressure exerted by the fingers on opposite sides of the rectangular portion 22 will cause the projections 24 to be brought together as clearly shown in Fig. 3 and for the purposes which will soon be explained.

As clearly noted in Figs. 1, 4 and 7, a fastener member 21 is attached to each of the ends 17 and 18 by inserting the portion 22 between the layers of material adjacent the free ends thereof with the arms 23 projecting therebeyond and held in such position by bar tacking or any other kind of stitching or other suitable attaching means. According to my invention I design the portion 22 of the member 21 in such manner that parts 22a thereof will lie parallel to and closely adjacent the longitudinal edges of the neckband ends 17 and 18, and with the parts 22b lying parallel to and closely adjacent the transverse edge of each loop. By this construction the inner free ends 17 and 18 are always maintained in neat, non-folded and non-wrinkled shape because of the fact that the member 21 follows substantially the contour of the neckband end.

Attached to the inner layer of the neckband parts 15 and 16 and suitably positioned for the purposes intended are a series of spaced transversely disposed loops 25, the said loops being made of any suitable material and permanently attached to the inner layers of said neckband parts. If desired the said loops 25 may be spaced apart to correspond to neck sizes for the bow tie.

In view of the above construction and arrangement it is seen that in order to adjust the necktie to a desired size the ends 17 and 18 of the neckband parts, after being received in the openings 19a and 19b of the connector member 19 are advanced in opposite directions a predetermined amount until the desired loops 25 are reached. The free ends of the neckband parts adjacent the members 25 are then pressed between the fingers to contract the portions 24 as shown in Fig. 3, until they will freely pass through the desired loop 25. Upon release of the finger pressure the fastener members 21 will be held captive in the loops 25, as shown in Figs. 1, 4 and 7.

As clearly seen from Fig. 12, if it is desired to remove one of the neckband parts from the connector member 19, it is merely necessary to cause the looped over portion to pass upwardly and out through the inclined openings 51 or 52 depending upon which neckband part it is desired to remove. This process of removal of one of the neckband parts can be accomplished after the bow tie is made up and without disturbing the bow and later replaced by simply passing the looped over end of the neckband part through an opening 51 or 52. The angular direction of the openings 51 and 52 prevents the undesired displacement of the neckband parts 15 and 16 from the connector member 19. It is also noted that the necktie size can first be adjusted for each of the neckband parts and thereafter interconnected by the member 19.

If desired and according to my invention the loops 25 may be replaced by slitted openings 27 as clearly shown in Fig. 5, the ends 24 of the members 21, after being brought together are passed through the slit 27 and held captive therein, and at the same time hidden from view and protected from direct contact with the collar of the wearer.

In Fig. 6 I have shown a modified form of my invention whereby I am able to dispense with the loops 25 or the slitted openings 27 and yet produce an efficient and effective adjustment for the neck size of the bow tie. As clearly shown this form of my invention consists in making my fastener member 21¹ similar in every respect to the fastener member 21 shown in Fig. 2 with the one exception that the projections 29, instead of being made like the projections 24, are pointed at their ends in such manner as to readily pierce the material of the neckband parts. It is thus seen that by such construction I can compress the member 21¹ in the manner shown in Fig. 3, then press the ends of the projections 29 against the material of the neckband and upon release of such pressure the pointed ends of the projections 29 will pierce the said neckband material to hold the same captive.

In Figs. 8 to 10 I have shown another modification of my invention which comprises the neckband parts 15 and 16 similar to the parts shown in Figs. 1 and 7 interconnected by a connector member 37 similar to the connector 19. However, instead of the loops 25 or the slits 27 (Fig. 5) I provide metal or plastic eyelet members 43 permanently fixed to the material of the neckband and adapted to releasably receive therein cooperating male fastener units 38, 42 shown in detail in Fig. 10 and constructed as follows:

The terminal ends of each neckband part 15 and 16 are cut to any desired shape, such as for example, the pointed ends shown and an opening 43 provided in the material. An upper rigid plate 39 carrying a hollow male fastener member 38 and an under plate 41 carrying a male fastener member adapted to functionally fit into the hollow upper member 38 are disposed on opposite sides of the neckband material. It is noted that the upper and lower plates 39 and 41 respectively are of the same contour and in registry with the pointed ends of the neckband material. Upon compressing the plates 39 and 41 the member 42 passes through the opening 43, is frictionally received within and held by the hollow member to thereby provide a reinforced neckband end which will not ravel and which will maintain its unwrinkled shape and neat appearance at all times. Adjustment of the neck size may be obtained by selectively resiliently forcing the male fastener element 38 into an eyelet member 43. The member 43 may be of the type having a central aperture through the material or it may be as shown in Figs. 8 and 9 where a depressed opening is provided for the reception of the member 38.

In Fig. 13 I have shown another form of connector member 53 which may be formed from a single piece of wire or other rigid material and shaped substantially rectangular as shown with a split opening 54 at the top communicating with an enlarged interior space 55. The looped over neckband ends are passed through the opening 54 and into the space 55. The opening 54 is made relatively narrow so that in forcing the looped neckband therethrough the resilience of the construction of the member 53 will cause enough separation to permit entry into the space 55, after which the space 54 will spring back and hold the looped ends in interconnection within the space 55. If desired I may provide a plurality of barbs 60 projecting from the legs of the member 53 in such manner as to bite into the material of the neckband and thus prevent slipping of the looped parts. This connector member 53 may be substituted for the connector members 19 or 37.

In made up bow ties the connector members 19 or 53 of my invention may be employed with greater benefit than the hooks heretofore employed. In Fig. 11 I have shown how any one of the forms of my connector members, such as, for example, conector member 19 may be employed in connection with the usual type of made up bow tie 45, having a neck band portion 48 connected to an elastic tape 47 which in turn passes through the loop 46. The free end of the band 48 is folded over on itself to form a loop 49 as shown which may be maintained by stitching 49a. A portion of the elastic tape 47 extends to the opposite side of the loop 46, to the end of which is attached the connector member 19. It is thus seen that for putting on or taking off the necktie it is merely necessary to pass the loop 49a of the neckband free end through the open passage 51 of the connector member 19.

While in Figs. 1 and 8 I have illustrated the use of fastener means applicable to neckties in which both parts 15 and 16 of the two part neckband may be adjusted as to neck size, it is understood that my invention is equally satisfactorily adaptable for necktie constructions in which only one neckband part 15 is the same as that shown in Fig. 1, including the same fastener member 21 cooperating with the loops 25 as hereinbefore described and connected to the connector member 19 in the manner formerly described. However, instead of a similar neckband part 16 being employed, I use a neckband part 70 at the inner free end of which I provide a loop by folding the material over on itself and stitching the same in position by the stitching. I omit fastener members 21 and loops 25. The looped end of the neckband part 70 is passed through the opening 51 in the connector member 19 in the same manner as described in connection with Fig. 11.

It should now be apparent that with the use of the fastening devices and connector members of the present invention that the construction of ties has been simplified and as well the operation of adjusting the neck size and securing the tie to the neck of the wearer. It should also be apparent that the tie can be constructed with fewer operations and with less expense.

It is noted that in the Figs. 8 to 10 form of my invention a great saving of cost and time is effected because it is not necessary to finish off the inner neckband ends. After the plates 39 and 41 are clamped together the material can be trimmed off along the edges of the said plates 39 and 41 as guides.

While in the drawings I have illustrated my invention as applied to bow ties, it is understood that my invention may also be satisfactorily applied to four-in-hand neckties and my invention extends to such use.

While various changes may be made in the detail construction, it shall be understood that such changes shall be within the spirit and scope of the present invention as defined by the appended claims.

I claim:

1. In a necktie construction of the type wherein two independent neckband parts are interconnected by a connector member and wherein a portion adjacent the free inner end of at least one of said neckband parts is folded over on itself to form a loop and wherein said last-named free end is provided with a fastener member—that improvement in which said fastener member comprises a main portion fixedly attached to the free end of said neckband part, a pair of resilient finger portions integral with said main portion and projecting beyond the extreme edge of said free end of said neckband part, said finger portions terminating in angular portions extending in opposite directions away from each other, said pair of fingers being normally resiliently urged in opposite directions away from each other, cooperating means on said neckband part for receiving and resiliently releasably holding said fingers, said cooperating means comprising openings adapted to receive said fingers therein, the size of said openings being smaller than the normal distance between said opposite extending angular portions of said fingers whereby said fingers upon being pressed together against their normal resilient action will reduce the distance between the fingers a sufficient amount to permit them to enter said openings and upon release of said pressure on said fingers they will spread apart and be captively held in said openings.

2. A necktie construction according to claim 1 in which the said oppositely extending angular portions are substantially at right angles to said projecting finger portions.

3. A necktie construction according to claim 2 in which said last oppositely extending angular portions terminate in sharply pointed ends designed to pierce the material of said neckband for the purposes set forth whereby any necktie size adjustment can be obtained between standard sizes.

4. In a necktie construction of the type wherein two independent neckband parts are interconnected by a connector member and wherein a portion adjacent the free inner end of at least one of said neckband parts is folded over on itself to form a loop and wherein said last named free end is provided with a fastener member—that improvement in which said fastener member comprises a main portion fixedly attached to the free end of said neckband part, a pair of resilient finger portions integral with said main portion and projecting beyond the extreme edge of said free end of said neckband part, said pair of fingers being normally urged in opposite directions away from each other, said fingers terminating in oppositely extending portions substantially at right angles to said projecting finger portions, said last-named extending portions terminating in sharply pointed ends designed to pierce the material of the adjacently disposed neckband to retain the necktie in any selected neck size.

SAMUEL RICHMAN.

REFERENCES CITED

The following references are of record in the file of this patent:

UNITED STATES PATENTS

| Number | Name | Date |
| --- | --- | --- |
| 804,788 | Barabasz | Nov. 14, 1905 |
| 1,081,609 | Hazard | Dec. 16, 1913 |
| 1,791,638 | Richman | Feb. 10, 1931 |
| 1,797,074 | Clark | Mar. 17, 1931 |
| 2,083,106 | Wolfson | June 8, 1937 |
| 2,125,715 | Goldenberg | Aug. 2, 1938 |
| 2,139,510 | Mayer | Dec. 6, 1938 |
| 2,212,862 | Hirsch | Aug. 27, 1940 |

FOREIGN PATENTS

| Number | Country | Date |
| --- | --- | --- |
| 6,860 of 1913 | Great Britain | Apr. 20, 1914 |
| 190,868 | Germany | Feb. 3, 1907 |